US006658412B1

(12) United States Patent
Jenkins et al.

(10) Patent No.: US 6,658,412 B1
(45) Date of Patent: Dec. 2, 2003

(54) COMPUTER-BASED METHOD AND SYSTEM FOR LINKING RECORDS IN DATA FILES

(75) Inventors: Laura Jenkins, Newtown, PA (US); Thomas J. Jirele, Newtown, PA (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 09/345,825

(22) Filed: Jun. 30, 1999

(51) Int. Cl.[7] .............................................. G06F 17/30
(52) U.S. Cl. ................................................ 707/5; 707/6
(58) Field of Search ........................................ 707/1–6

(56) References Cited

U.S. PATENT DOCUMENTS

| 5,935,060 A | * | 8/1999 | Iliff ........................... 600/300 |
| 5,946,681 A | * | 8/1999 | Shorter ........................ 707/3 |
| 6,026,398 A | * | 2/2000 | Brown et al. ................. 707/5 |
| 6,070,160 A | * | 5/2000 | Geary ........................... 707/4 |
| 6,301,571 B1 | * | 10/2001 | Tatsuoka ..................... 706/45 |

OTHER PUBLICATIONS

Salmond, D. J. et al., "Group and Extended Object Tracking", 1999, Target Tracking: Algorithms and Applications (Ref. No. 1990/090, 1999/215), pp. 16/1–16/4.*

* cited by examiner

Primary Examiner—James P. Trammell
Assistant Examiner—Mary Wang
(74) Attorney, Agent, or Firm—Sills Cummis Radin Tischman Epstein and Gross; Michael I. Chakansky

(57) ABSTRACT

The present invention relates to computer-based technology for linking or matching records in data files, based on at least one identifier in common, with a threshold probability that records are linked, the method uses a Bayesian probabilistic approach to determine the likelihood that the identified records are linked.

7 Claims, 1 Drawing Sheet

COMPUTER-BASED METHOD AND SYSTEM FOR LINKING RECORDS IN DATA FILES

Figure 1:
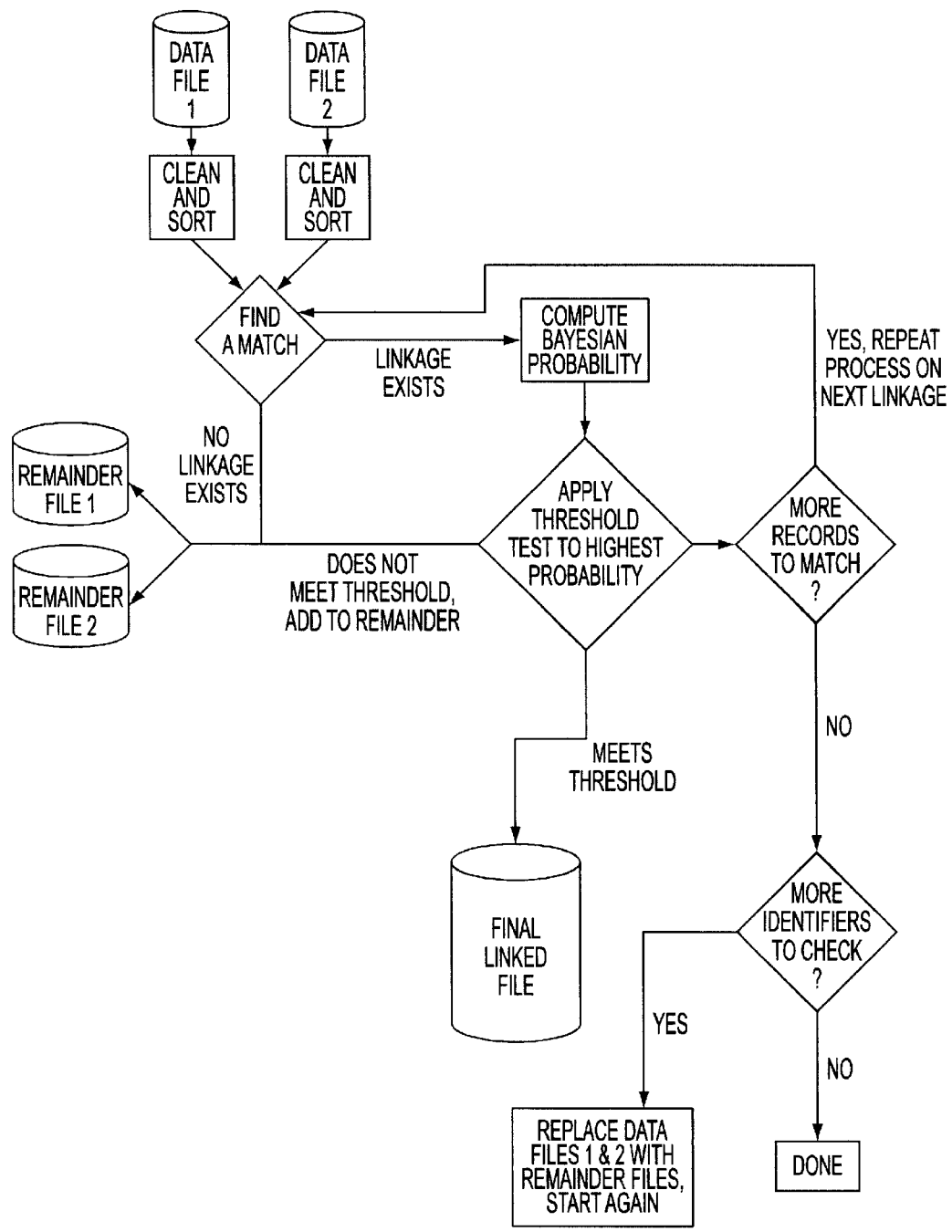

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

This disclosure incorporates by reference the material on the compact disk labeled CD-ROM I constitutes of two copies (Copy 1 and Copy 2), each having the following files: source.code.appendix.09_345825.txt (83,523 bytes) and source.code.appendix.09_345825.wpd (156,003 bytes), the first a text file format the second a WordPerfect file format; in an IBM PC FORMAT for use in a MS WINDOWS environment. This material is referred to herein as the Computer Program Listing Appendix.

BACKGROUND OF THE INVENTION

1. Field of the Invention

The present invention relates to computer-based technology for linking or matching records in data files. In many cases it is important to link or match different records pertaining to the same individual. The matching and linking method and system of the present invention can operate as a totally automated matching system with improved match rates while reducing the number of false matches. Matching methods are used in many areas of education, business and commerce. In today's information age, it is important to be able to efficiently and accurately match data from a variety of sources while allowing various levels of accuracy.

2. Description of Related Art

Many existing matching methods and systems use what is called a weighting scheme, where points are awarded if some identification information on two data files matches. One type of weighting system might award the following points for various identification fields:

| | |
|---|---|
| Social Security Number | 80 points |
| Last Name | 40 |
| First Name | 30 |
| Middle Initial | 12 |
| DOB | 40 |
| Zip Code | 12 |
| Gender | 12 |

There are two major deficiencies with using this type of scheme. Weighting schemes are not based on sound, statistically defensible criteria. For example, the inventors are unaware of any proof that social security number is twice as important as last name when matching data across multiple files. The second deficiency is that the weighting scheme does not look at combinations identification information or the interaction of the identification variables. Moreover, basic probability theory tells us that adding together the weights of fields that match tends to over-estimate the likelihood of a true match.

SUMMARY OF THE INVENTION

One preferred embodiment of the present invention uses a multi-stage probabilistic approach to matching students across program files. This multi-stage approach allows us to use different matching or linking criteria to produce potential matched pairs of student information for later evaluation. The first stage uses student social security number as a basis for matching students. Students not being matched in the first stage are reevaluated in the next stage. One preferred embodiment of the present invention has a second stage of matching that uses a combination of last name and first name as a basis to match students and search for additional student matches across the two files. Once a potential match is found, the likelihood that it is a true match or link is evaluated using a probabilistic model. Additional stages, based on other identification fields, can be added in an iterative manner.

A Bayesian approach was used to develop appropriate probability models. In one preferred embodiment of the present invention seven identification fields (identifiers) were used in determining the probability that a matched pair of records is indeed the same student. Those fields are last name, first name, middle initial, social security number, and date of birth, zip code and gender. Based on a national sample of overlapping students from two sources we determined the probability that students who are the same have information that matches and also the probability that their identification information does not match. Then we used two national samples that do not contain overlapping students to determine the probabilities that students who are not the same will have matching identification fields.

When a potential match is found, these base probabilities are used to calculate the conditional probability that the matched records are the same students. Many times multiple matches will occur using a given identification string. For example we may find 3 Jane Smiths in file 1 on 2 Jane Smiths in file 2. When this occurs we calculate probabilities on all possible pairs of matches and then use the highest probability pair. All matched pairs of records must have a probability above a certain threshold to be considered a match.

By adjusting this threshold level we can increase our matching rate, at the expense of more false matches or decrease the matching rate to get a cleaner matched sample. In our trials we tried numerous threshold levels and evaluated the matched pairs that passed the threshold test for accuracy in matching. We also evaluated the matched pairs that failed the threshold test to see if we were inadvertently excluding students who were obvious matches.

This methodology is a great improvement because adjustments to the model are easy to implement and are statistically defensible. Matching different populations of people would only require adjustments to the program parameters, not the methodology or software. This is a great plus. This parameterization allows any 2 populations regardless of program area or content to be matched with just inputted parameters. As with ACES, research analysis was done to calculate the initial Bayesian statistics, such analysis would need to be done to create those initial numbers prior to matching. This method needs not resolution or human intervention. It is PC-based, which helps keep costs down. Preliminary cleaning of data was also found to enhance the match.

Although preferred embodiments of the present invention are described below in detail, it is desired to emphasize that this is for the purpose of illustrating and describing the invention, and should not be considered as necessarily limiting the invention, it being understood that many modifications can be made by those skilled in the art while still practicing the invention claimed herein.

BRIEF DESCRIPTIONS OF THE DRAWINGS

FIG. 1 is a flow chart shows the data flow, matching logic and decision points for one preferred embodiment of the present invention.

DETAILED SUMMARY OF THE INVENTION

In developing any matching algorithm, one must first know the characteristics of the files you wish to match. The primary step taken in researching these characteristics is, of course, to establish like identifying information. Preliminary data analysis of these variables establishes the domain of the algorithm. The domain consists of elements of the data record, which are the primary identifying variables with the highest rate of reliability and commonality amongst the files. There is also a secondary domain, which contain a few variables that will be used in verification of a successful match.

In one preferred embodiment of the present invention the records and data files comprised student data from the SAT, PSAT and AP examinations. The domain variables were found to be: Social security numbers (SSN), Last name (LN), First name (FN), and Middle Initial (MI), date of birth (DOB) and gender (G). The secondary domain variables were HS code and zip code.

Once the primary and secondary domain variables are established, the beginning steps can be taken to match the files. A common problem to matching files such as the SAT and PSAT, is the size of the files themselves. Instead of using the entire file during the matching process, an extract file is created containing all matching domain and the original record number of the file. Working with much smaller files greatly decreases the cost of processing the files, as well as increasing the speed at which the mainframe computer can run the programs. For example, the SAT record can have a record length of over 15000 bytes. Each record in all of the extract files is 66 bytes. The SAT file now resides on 3–4 karts. The SAT extract file can be easily stored and accessed on the mainframes disk packs for short periods of time. The PSAT and AP files have a like scenario. The program files for these extractions are attached.

The next step is to develop a conditioning process to clean the matching variable of invalid codes and commonly found mistakes. An example of this is a blank space between names. Examples of conditioning are:

Eliminating blanks within domain-fields. For example, Mary Ann would become Maryann.

Trailing repeated characters are eliminated. It was found in the program files, that a common problem is the last or first name field being filled with "A"s. Any name with more than 2 repeated characters are turned to blank.

Extra Surnames are eliminated. It was found that JR, SR, I, II, III after last names can be inconsistent across files. Eliminating them for matching give a better rate of agreement.

Distributions of frequency of last name. This was done to allow the commonality of a surname furthers the accuracy of a deciding a match from a mismatch. Though the step of looking up a name rate of occurrence is a not a common matching step, it is only done if two names disagree by more than a few letters and the accuracy of the match is still not decided.

Domain variables found to be out of range are set to blank, for example: SSN's with a first 3 digits that are 000.

Also a part of the conditioning process is a preliminary pass through the data files in an effort to eliminate obvious duplicate records. In order to facilitate the matching process we need explore why records don't match. We took a sample of matched records, threw out all true matches, and then examined the ones that didn't match but logic tells us they should. From this exploration, not only would we establish errors to fix, but also find the basis for the matching algorithm. The result of this process was that we established 15 typical mismatches that should be matches. These are outlined in the TABLE A.

TABLE A

1st Prior information:

Percentage Overlap:
PSAT/SAT .70
PSAT/AP .85
SAT/AP .80
For the purpose of explaining the scenarios of matching there are considered to be 4 matching criterion:
SSN (social security number)
NAME (which consists of last name, first name and middle initial)
DOB (day and month of birth)
Gender
$2^{nd}$ and $3^{rd}$ Prior Information:

1. Records have 4 unique matching criteria | the kids are the same person).75654.00000
2. Records have 3 unique matching criteria, SSN, Gender & name | . . .).01163.00000
3. Records have 3 unique matching criteria, SSN, Gender & DOB | . . .).14622.00004
4. Records have 3 unique matching criteria, SSN, DOB & name | . . .).00062.00000
5. Records have 3 unique matching criteria, DOB, Gender & name | . . .).04359.00000
6. Records have 2 unique matching criteria, SSN & Gender | . . .).02659.00398
7. Records have 2 unique matching criteria, SSN & Name | . . .).00008.00000
8. Records have 2 unique matching criteria, SSN & DOB | . . .).00027.00004
9. Records have 2 unique matching criteria, Gender & Name | . . .).00079.00493
10. Records have 2 unique matching criteria, DOB & Gender | . . .).00582.01913
11. Records have 2 unique matching criteria, Name & DOB | . . .).00000.00000
12. Records have only SSN in common | . . .).00010.00400
13. Records have only Gender in common | . . .).00027.41602
14. Records have only Name in common | . . .).00002.00500
15. Records have only DOB in common | . . .).00000.03449

Once the data are conditioned, then the matching itself can be initiated. The algorithm developed for the present invention is substantially different than many traditional matching algorithms used by the invention in the past. In prior algorithms, a series of conditions are checked and if found to be true, a match is established. This set of conditions and the structure are very conservative in nature and though they give a high degree of accuracy of the match, they also will not match records that should be matched.

The present invention uses a Bayesian approach to matching. This Bayesian approach is an improvement over the traditional 'weighting' schemes to match. The Bayesian approach takes into account more information in determining the probability of a true match and also looks at the interaction of all the identification elements. For example, if two records are found, where the last name, first name, date of birth and zip code match, but social security number does not match we can compute the probability that all these events will happen when the two records are in fact the same kids. Conversely, we can also compute the probability that this series of statements is true if the two records are not the same two kids. The traditional 'score' or 'weighting' approach gives a certain number of points for a field matching or not matching, regardless of what other identification characteristics match. In our case, the social security number not matching, is taken into account simultaneously with all other matching criteria.

The first step in applying a bayesian approach to is to identify a sample representative of the population of interest from which we can establish a set of 'priors'. From this sample we have to compute 'true' probabilities which will be used in the matching algorithm. It is important that this sample be as error free as possible, since the assumptions made in the matching software will be based on this sample.

We use this sample and apply Bayes' Theorem to compute the conditional probabilities that two records match based on the identification information that either does, or does not, match. Bayes' Theorem states that the probability of an event (called $B_k$), given another event (called A) can be stated $$P[B_k \mid A] = \frac{P[A \mid B_k] P[B_k]}{S(P[A \mid B_j] P[B_j])}$$

In our case $B_k$ represents a piece of identification information that either matches or does not match. A is the given fact that the two records either are, or are not, the same person. Using the identification fields of interest we calculated all possible combinations of matching and non matching identification fields for two samples of students, those who are true matches and those who are not. The matching software will use these probabilities to grade the likelihood that two unknown records are, or are not, the same person and apply a decision rule to make the decision to accept or reject a potential match.

In our case we collected two samples of students in which to base our conditional probabilities. The first sample was a file of 107,000 college freshman from 14 United States universities. These universities were diverse in geographic region, selectivity, size and other institutional characteristics. They included schools such as University of Texas, Vanderbilt, Kutztown University, University of Maryland, Ohio State and Harvard, among others. These school samples were matched to the ETS data base using traditional matching techniques. Extensive hand resolution was performed on each school to assure that all possible matches were made and any questionable or incorrect match was discarded. Almost 15,000 students were eliminated for these reasons leaving a file of 92,000 matched students.

A second file was also created. This file consisted of 100,000 college bound seniors from 1994 and 1997. A college bound senior is a student who is graduating high school in a certain year (called the cohort year) and intending to attend a post-secondary institution. These files go through extensive 'in-file' matching to make sure that duplicate records do not exist within a cohort. We combined samples from two cohort years in creating our sample file. This file was assumed not to contain any 'true' matches.

We used four major identification fields to match records: name, social security number, date of birth and gender. These four identifications fields yield 15 possible combinations of matching identification fields. These are $B_1$ all 4 matching criteria are the same
$B_2$ SSN, gender & DOB match
$B_3$ SSN, name & DOB match
$B_4$ SSN, gender & name match
$B_5$ name, gender & DOB match
$B_6$ SSN, & DOB match
$B_7$ SSN, & gender match
$B_8$ SSN, & name match
$B_9$ name & gender match
$B_{10}$ name & DOB match
$B_{11}$ gender, & DOB match
$B_{12}$ only SSN matches
$B_{13}$ only name matches
$B_{14}$ only gender matches
$B_{15}$ only DOB matches Each of these probabilities is computed for each of our two sample files. The first file represents the group where we have all known matches, the second file contains no correct matches. Using these files we arrived at the following probabilities:

| | | A = All true matches | A = no |
|---|---|---|---|
| | true matches | | |
| $B_1$ | all 4 matching criteria are the same | .7565 | .0000 |
| $B_2$ | SSN, gender & DOB match | .1462 | .0001 |
| $B_3$ | SSN, name & DOB match | .0006 | .0000 |
| $B_4$ | SSN, gender & name match | .0116 | .0000 |
| $B_5$ | name, gender & DOB match | .0436 | .0000 |
| $B_6$ | SSN, & DOB match | .0003 | .0001 |
| $B_7$ | SSN, & gender match | .0266 | .0040 |
| $B_8$ | SSN, & name match | .0001 | .0000 |
| $B_9$ | name & gender match | .0008 | .0049 |
| $B_{10}$ | name & DOB match | .0000 | .0000 |
| $B_{11}$ | gender, & DOB match | .0058 | .0191 |
| $B_{12}$ | only SSN matches | .0001 | .0040 |
| $B_{13}$ | only name matches | .0000 | .0050 |
| $B_{14}$ | only gender matches | .0003 | .4170 |
| $B_{15}$ | only DOB matches | .0000 | .0345 |

These probabilities are used in Bayes' Theorem to calculate the probability that two records match. We then examine the distributions of matched probabilities do determine the appropriate threshold, or level at which we will state two records are indeed the same person. Extensive hand resolution was done in comparing the various probabilities with other identification criteria such as address, zip code, high school attended in order to set an appropriate threshold that will maximize our match rate and minimize the Type I error rates.

This methodology will be helpful to others in their application of automated computerized matching. It has application in the business world in the areas of marketing, credit searches, tax and title searches and areas of government. It has two major strengths. First it is based on sound statistical principles. Bayesian statistics are widely accepted as a powerful forecasting tool. Second it allows the user to vary their threshold level depending on the purpose. A low threshold may be appropriate for marketing purposes where there is little or no consequence of getting a low matching rate. As the 'penalty' for incorrect matches increases the threshold level can be raised. Mass mailings have a low cost so a high error rate would be tolerable. As marketing moves into phone surveys and soliciting clients the cost associated with a matching error increases, so the threshold level could be raised to an acceptable standard. One can easily conceive of the necessity of governments to accurately match tax and property information with a high cost of being incorrect. In that case a higher threshold would be warranted.

The new algorithm of the present invention uses a Bayesian statistical approach to determine if the records are matched. This approach allows for us to examine those matches that previously would be missed, thereby giving us gains in our percentage of matches. Basically, Bayes' techniques take information previously known about something and uses it along with current knowledge to make a decision about the current situation.

In order to run Bayes for our purposes; three sets of information need to be obtained. The first are the percentages of true overlap there are between the files.

What percentage of students who took the SAT also took the PSAT?

What percentage of students who took the SAT also took the AP.

What percentage of students who took the PSAT also took the AP.

These numbers we obtained from current matching percentages across these files. This was the most accurate measure we could establish.

The second set of "priors" as they are called, is to calculate the 15 sets of probabilities of identification in fields matching or not matching for records that are a true match. The third set of "priors" is the probability in those 15 scenarios that the records are not true matches. With those three pieces of previously known information, we can evaluate a pair of records and statistically calculate the probability that they are in fact a match. Once that probability is created, it can be tested to be above or below a threshold probability (similar to a cut-score) and a matched record is or is not created.

Now that we established the priors, which should be reviewed every several years, we then created the programs to actually match the files. There is one main program and 3 subroutines that entail the whole matching process. The programs are in the Source Code Appendix. The basic layout is:

MAIN PROGRAM
  For each pair of files to be matched: RUN MATFILES:
  Subroutine MATFILES
    FOR each type of primary match key (SSN or 4 letters of lname,first initial)
    Getrex the records
    If duplicate id, put into hold
    If not duplicate, RUN CHECK_HOLD
    If 1st pass, use remainder files for input into next pass
    If 2nd pass, end process
  Subroutine CHECK_HOLD
    If one record in hold and 1st pass, put in remainder file and 2nd pass put out record as unique
    If 2 or more records in hold go through all possibilities of matching
  RUN MATCH
    If score is > threshold: Write record ids and score to file
    Sort score file
    Go through all possibilities
    If match, create a new record
    Else if 1st pass, send record to remainder file 2nd pass, create unique record in matched file
    End process The Matching Software of One Preferred Embodiment of the Present Invention.

The matching module uses a matching algorithm utilizing Bayesian Statistics to calculate the probability that any two records are a match This documentation is intended to help the user understand and modify, if necessary the input/output parameters and files in using the subroutines below.

The matching software utilizes 6 subroutines, called from a main program. All the subroutines may be found in the Source Code Appendix.

The main program ACESmain (see Source Code Appendix, ACESmain.f90) requires 5 parameter files, 2 input files and creates 1 matched output file, and 2 output match results files:

| Filename | File Type |
|---|---|
| Match.in | Parameter |
| Cohort.fil | Parameter |
| Matchid.pos | Parameter |
| Crlf.dat | Parameter |
| Schldata.lay | Parameter |
| Schldata.edt | Input file |
| Cohort | Input file-name received from cohort.fil |
| Schldata.mat | Output matched file containing cohort record followed by schldata.edt record and then matching probability |
| Match.prt | Output file containing specifics on the matcher and The programs run-time actions. |
| Match.out | Output file containing resulting match performance |

File specifications:
MATCH.IN
  Match.in contains the match file parameters. The file contains 1 record with the following format:

| Beg Col | End Col | Format | Description |
|---|---|---|---|
| 1 | 4 | i4 | Year of cohort data to be matched |
| 5 | 6 | i2 | Number of years to cycle through |
| 7 | 10 | 2i2 | Debug flags (0/1) 1st = routine output statements 2nd = Error finding/debug |
| 11 | 11 | | Filler |
| 12 | 15 | i4 | First year of cohort to match |
| 16 | 20 | f5.3 | Threshold for matching probability, matches meeting or exceeding this threshold are considered a good match. |
| 21 | 21 | | Filler |
| 22 | 25 | i4 | Position where Schldata.edt record will start in matched file record |
| 26 | 26 | | Filler |
| 27 | 30 | | Record Length of Cohort file |

COHORT.FIL
  Cohort.fil contains the number of cohort files, the year and the names and positions of the data files to be used during the matching. There are two input cohort files for each year. The first is the full student data record which for 1995–1998 has a record length of 1522, but may increase for future cohorts and thus need adjustment in the match.in parameter file. The second cohort file contains an "extract" of the first file. This file contains the identifying information (used in matching) for each student record and the corresponding record number to the full cohort student data file. The actual matching is done on the extract file and then the matched records are "expanded" to contain the full records. This was done to speed up the matching and also to conserve disk space during the matching. The format of this input file is:
Record 1: columns 1–2 (i2 format) contain the number of cohort files available and described in this file (ie, the next set of Records will be repeated this number of times. The order of file information is from the most recent year to the oldest year. (ie, 1997 will be first then 1996, then 1995.) When a new cohort year is added, increment the number of cohorts and add the new year before the prior year.
For each cohort file available (repeat for each cohort):
  Record 1: columns 1–4 (i4 format) contain the year of the cohort (ie, 1997).
  Record 2: columns 1–20 (character format) the fully qualified cohort file name (ie, e:\y1997.coh).

Record 3: columns 1–20 (character format) the fully qualified cohort extract file name.
MATCHID.POS Matchid.pos contains the positions within the above cohort.ext file where the matching id information is Found. The format is as follows:

| Record 1: | columns 1–3 | (i3 format) | Social Security number |
|---|---|---|---|
| Record 2: | columns 1–3 | (i3 format) | Last Name |
| Record 3: | columns 1–3 | (i3 format) | First Name |
| Record 4: | columns 1–3 | (i3 format) | Middle Initial |
| Record 5: | columns 1–3 | (i3 format) | Gender |
| Record 6: | columns 1–3 | (i3 format) | Date of Birth |
| Record 7: | columns 1–3 | (i3 format) | Zip Code |
| Record 8: | columns 1–3 | (i3 format) | Record Number in Cohort file (i7) |

CRLF.DAT

Crlf.dat is a data file used in the matching routines. It needs to exist, but not changed in any way.

SCHLDATA.LAY

Schldata.lay contains the positions within the schldata.edt (the matching file for school data) files where the matching ID information is found. The first 4 lines of the schldata.lay file are header and need to be skipped. The code within the main program does this. If your schldata.lay doesn't contain header information, you need to comment out that code. Schldata.lay contains more than just the positions for the matching id, so the main program looks on for certain data "types", this is a attribute of the schldata.lay file. The type code (found in position 44) must be equal to 6 and the key code (found in position 50) must not be equal to 0. The key code tells the matching routines what the ID element is. For example, type=6 and key=1 is SSN. The key codes are as follows:

Key ID Element

1 SSN

2 Last Name

3 First Name

4 Middle Initial

5 Gender

6 Date of Birth

7 Zip Code

SCHLDATA.EDT

Schldata.edt is the matching input file for the school data. It's record length and layout are found in the previous files. The file is created by the ACES editor.

COHORT file

The cohort filename, record length and layout are found in previous files.

SCHLDATA.MAT

The schldata.mat file is the final result of the matching routines. It contains both the matched and unmatched records from the 2 input files (schldata.edt and full cohort file). The record length is cohort record length PLUS the schldata.edt record length.

THREE FILE MAIN PROGRAM (see Source Code Appendix).

This main program using the matching subroutines to match 3 different data files. It matches each combination of files. It matches the initial 2 files, then for the next match uses the resulting datafile from the first match as input. The last match uses the resulting files to match the last 2 files identifiers previously unmatched:

Identifiers used from

| 1st match: | File1 + File2 = File1_2 | File1 & File2 |
|---|---|---|
| 2nd match: | File1_2 + File3 = File1_3 | File1 & File3 |
| 3rd match: | File1_2 + File1_3 = File123 | File2 & File2 |

The parameters needed by the initial matching subroutine matfiles are hard-coded in this example.

COHORT MAIN PROGRAM (see Source Code Appendix)

This main program using the matching subroutines to match 2 files at a time. All parameters needed by the matching subroutines are inputed from parameter files. This is the most basic usage of the matching subroutines.

SUBROUTINES IN MATCHING SOFTWARE:

There are 6 subroutines used in the matching software (see Source Code Appendix). The following are brief descriptions of them.

MATFILES: Matfiles is a subroutine called from the main program.

It is the main entrance to the matching software. This routine will go through 2 passes or stages of pairing records with the same matching key. The number of stages could be up to the number of matching fields used. Each stage pairs using a specific matching key. The first stage, in this case, uses Social security number. When two records are found that have the same key, they are placed in a holding vector. Once all records from either file with the same key are found, then the routine calls CHECK_HOLD to evaluate which, if any of the records should be linked. At each stage of the matching, the files need to be sorted in the order of the matching key being used during that stage. For example, the first pass here uses Social security number. Both files are sorted by SSN. This allows the software to properly pair the records appropriately. See source code MATFILES for coding specifics.

The following parameters are passed:

| Variable | Type | Structure | Description |
|---|---|---|---|
| Files | char | vector (5) | Files contains the filenames used during this pass of the match. |
| Ifiles | integer | matrix (7,2) | Ifiles contains the matching ID positions of the files being matched |
| Iscr | integer | scalar | iscr is not used in ACES, but is the position where the matched records score (probability) is placed. |
| Threshold | real*8 | scalar | Threshold for matching probability |
| Debug | boolean | vector(2) | Debugging flags to modify output |
| Lrec | integer | scalar | The maximum record length of the cohort or school data file this sets parameters within the matching subroutines |
| Lrec1 | integer | vector(2) | Record length of cohort and schools data files in that order |
| Last | boolean | scalar | flag to tell the subroutines that this is/not the last year of matching to be performed. If false, then the remainder files are used and saved for next year of matching. If true, then the unmatched records are added to the schldata.mat file. |

-continued

| Variable | Type | Structure | Description |
|---|---|---|---|
| Nrec | integer | vector(3) | This contains the number of matched/unmatched records for this round of matching. |

CHECKHOLD: This subroutine is called from the MATFILES subroutine. This is the second of the main matching software subroutines. This subroutine is called by the MATFILES routine when records have the same matching key have been paired and placed into a holding vector. CHECK_HOLD goes through all possible combinations of pairings from the two files and calls the routine MATCHSCR to calculate the probability that they are a match. It stores the records links and scores in a temporary holding file, sorts that file by the probability score (highest to lowest), and takes the highest probability match for each pair. If the threshold for the score is met or exceeded, it creates a new record made up from the two record links. Once a record has been linked, it cannot be linked again either in a subsequent pass or within the same pass. This eliminates the possibility of duplicate matching. If a record is not linked, either because the score was lower than the threshold, or it wasn't linked, that record is put into a remainder file for use in a subsequent pass or stage. If this is the final stage, the record will be outputed to the final dataset.

It's calling sequence is:

| Variable | Type | Structure | Description |
|---|---|---|---|
| Hold | character | matrix(2,10000) | This matrix hold all records of matched primary IDS |
| Mhold | integer | vector(2) | The number of records held in hold for each file |
| Ifiles | integer | matrix (7,2) | Ifiles contains the matching ID positions of the files being matched |
| Ipass | integer | scalar | Identifies what pass is being done in matching 1 = SSN; 2 = Name (1st 4 letters of last name + 1st initial |
| Threshold | real*8 | scalar | Threshold for matching probability |
| Iscr | integer | scalar | iscr is not used in ACES, but is the position where the Matched records score (probability) is placed. |
| Debug | boolean | vector(2) | Debugging flags to modify output |
| Nrec | integer | vector(3) | This contains the number of matched/unmatched records for this round of matching. |
| Nscr | integer | vector(1001) | This tallies the number of scores within the range of probabilities |

-continued

| Variable | Type | Structure | Description |
|---|---|---|---|
| Lrec | integer | scalar | The maximum record length of the cohort or school data file this sets parameters within the matching subroutines |
| Lrec1 | integer | vector(2) | Record length of cohort and schools data files in that order |
| Last | boolean | scalar | Flag to tell the subroutines that this is/not the last year of matching to be performed. If false, then the remainder files are used and saved for next year of matching. If true, then the unmatched records are added to the schldata.mat file. |

MATCHSCR: This subroutine calculates, using Bayes Statistics, the probability that any 2 records are a match. The priors, needed to compute the probability, are hard-coded, but the routine can easily be modified so they are read in from a file the first time the routine is called. The priors use in ACES are based on research done on the Ramist-Lewis_McCamley database. This routine evaluates the matching identifiers and selects the appropriate conditional probability to calculate based on the presence of the fields.

The calling sequence is:

| Variable | Type | Structure | Description |
|---|---|---|---|
| Ifiles | integer | matrix (7,2) | Ifiles contains the matching ID positions of the files being matched |
| Pair | character | vector(2) | The 2 records to be matched |
| Scores | real*8 | scalar | The probability that the records are a match |
| Debug | boolean | vector(2) | Debugging flags to modify output |
| Lrec | integer | scalar | The maximum record length of the cohort or school data file this sets parameters within the matching subroutines |
| Lrec1 | integer | vector(2) | Record length of cohort and schools data files in that order |

GET2REX: GET2REX is a subroutine called by MATFILES. This subroutine sequentially goes through 2 files and compares the identifying information and returns a code if the identifying fields from the two files are the same. It uses input from the calling routine for all parameters. The return codes are:

m=1 if id is only in file1 m=2 if id is only in file2 m=3 if id is in both files

Its calling sequence is:

| Variable | Type | Structure | Description |
|---|---|---|---|
| A | character | vector(2) | A vector containing the records sequentially found from each file |
| nfld | integer | scalar | Number of fields in the identifier |
| ibeg | integer | vector(nfld,2) | Beginning positions for identifiers for each file |
| nch | integer | vector(nfld,2) | Number of bytes for identifiers for each file |
| m | integer | scalar | Return code for testing id fields |
| curid | character | scalar | The current id being used |
| files1 | character | vector(2) | The input filenames for the 2 files being matched |
| ntot | integer | scalar | The total number of bytes in the current id |
| id1 | character |  | The current id for file1 |
| id2 | character |  | The current id for file2 |
| Debug | boolean | vector(2) | Debugging flags to modify output |

EXPAND: Expand is a subroutine utilized only during matching for the ACES validity study system, but could be modified for other applications. The input file needed to match the ACES school supplied data in the ACES system, namely the ACES cohort file, is very large. In order to save both CPU time and space, an extract file was created from the cohort file. This extract contained only the identifying information needed for matching and the corresponding record number. This file was a fraction of the size of the ACES cohort file. After the matching has been completed, EXPAND then takes the matched output file, extracts the cohort record number and expands the matched record to include the entire cohort record.

Its calling sequence is:

| Variable | Type | Structure | Description |
|---|---|---|---|
| Lrec1 | integer | vector(2) | Record length of cohort and schools data files in that order |
| Cohort | character | vector(5) | cohort contains the filenames for the full cohort data files. A specific element of cohort is passed to EXPAND. |
| Crec1 | integer | scalar | position in matched record where school data starts |
| Arec1 | integer | scalar | Record length of cohort file |
| Pctmatch | real*8 | scalar | Percent matched of school data file to cohort |
| Last | boolean | scalar | Flag to tell the subroutines that this is/not the last year of matching to be performed. If false, then the remainder files are used and saved for next year of matching. If true, then the unmatched records are added to the schldata.mat file. |

DDT: This subroutine is used during the calculation of the probability score and is called by MATCHSCR. It is used to determine if there has been a deletion, duplication or transposition of 2 bytes within a field. The incidence of these 3 types of differences that often occur in identification fields, such as Social Security Number. If one or more of these occur in a given field, it can impact the matching probability score. This routine only returns the number of times any or all of these occurences.

We claim:

1. A computerized method for linking records in data files, based on at least one identifier in common, with a threshold probability that records are linked, the method comprising the steps of:
   a. identifying records in the data files having a first identifier in common,
   b. using a Bayesian probabilistic approach to determine likelihood that identified records, having a first identifier in common, are linked,
   c. linking identified records, having a first identifier in common, whose likelihood exceeds the threshold for linking identified records having a first identifier in common.

2. The method of claim 1, further comprising the steps of:
   a. identifying records in the data files, not already linked, having a second identifier in common,
   b. using a Bayesian probabilistic approach to determine likelihood that identified records, not already linked and having a second identifier in common, are linked,
   c. linking identified records, not already linked and having a second identifier in common, whose likelihood exceeds the threshold for Linking identified records, not already linked and having a second identifier in common.

3. The method of claim 2, further comprising the steps of:
   a. identifying records in the data files not already linked having a third identifier in common,
   b. using a Bayesian probabilistic approach to determine likelihood that identified records, not already linked and having a third identifier in common, are linked,
   c. linking identified records, not already linked and having a third identifier in common, whose likelihood exceeds the threshold for linking identified records, not already linked and having a third identifier in common.

4. The method of claim 3, further comprising the steps of continuing the steps of claim 3 for additional identifiers until either all records are linked or all identifiers have been used.

5. The method of claim 1, wherein the identifier is one of the following items: social security number; name (last name, first name and middle initial); day and month of birth; or gender.

6. A computerized system for linking records in data files, based on at least one identifier in common, with a threshold probability that records are correctly linked, comprising:

a. means for identifying records in the data files having a first identifier in common, b. means for using a Bayesian probabilistic approach to determine likelihood that identified records, having a first identifier in common, are linked, c. means for linking identified records, having a first identifier in common, whose likelihood exceeds the threshold for linking identified records having a first identifier in common.

7. A computerized system for linking records in data files according to claim 6, which is implemented using ACES-MAIN.F90; THREE FILE MAIN PROGRAM; COHORT MAIN PROGRAM; MATFILES; CHECKHOLD; MATCHSCR; GET2REX; EXPAND and DDT.

* * * * *